(12) United States Patent
Laverty et al.

(10) Patent No.: US 12,421,873 B1
(45) Date of Patent: Sep. 23, 2025

(54) PROPULSION AND ELECTRICAL SYSTEM FOR AN AIRCRAFT INCLUDING A FUEL CELL AND TURBINE ENGINE WITH A STEAM SYSTEM

(71) Applicant: General Electric Company, Cincinnati, OH (US)

(72) Inventors: James Laverty, Center Valley, PA (US); Arthur W. Sibbach, Boxford, MA (US); Daniel A. Niergarth, Norwood, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/789,149

(22) Filed: Jul. 30, 2024

(51) Int. Cl.
  *F01K 11/02* (2006.01)
  *B64D 41/00* (2006.01)

(52) U.S. Cl.
  CPC ........ *F01K 11/02* (2013.01); *B64D 2041/005* (2013.01); *B64D 2221/00* (2013.01); *F05D 2240/35* (2013.01)

(58) Field of Classification Search
  CPC .............. F01K 11/02; B64D 2041/005; B64D 2221/00; F05D 2240/35
  See application file for complete search history.

(56) References Cited

U.S. PATENT DOCUMENTS

| | | | | |
|---|---|---|---|---|
| 5,896,740 A | * | 4/1999 | Shouman | F01K 21/042 60/39.55 |
| 6,296,957 B1 | | 10/2001 | Graage | |
| 7,767,359 B2 | * | 8/2010 | Hoffjann | B64D 11/02 429/513 |
| 7,966,830 B2 | | 6/2011 | Daggett | |

(Continued)

FOREIGN PATENT DOCUMENTS

| | | |
|---|---|---|
| DE | 102008006742 A1 | 8/2009 |
| FR | 3127269 A1 | 3/2023 |
| FR | 3130896 A1 | 6/2023 |
| FR | 3130897 A1 | 6/2023 |
| FR | 3133367 A1 | 9/2023 |
| FR | 3133368 A1 | 9/2023 |

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

MTU Aero Engines, "Water-enhanced turbofan," available at https://www.mtu.de/technologies/clean-air-engine/water-enhanced-turbofan/, as viewed on Jun. 30, 2023.

(Continued)

*Primary Examiner* — Jesse S Bogue
(74) *Attorney, Agent, or Firm* — Venable LLP; David D. Leege; Michele V. Frank

(57) ABSTRACT

A propulsion and electrical system for an aircraft including a turbine engine and a fuel cell. The turbine engine includes a turbo-engine, a fan having a fan shaft coupled to the turbo-engine, and a steam system. The steam system is fluidly coupled to a water source to receive water. The steam system includes a boiler to vaporize the water and to generate steam. The steam system can be fluidly coupled to the core air flow path to inject the steam into the core air flow path. The fuel cell is fluidly coupled to a hydrogen source and an oxygen source to receive hydrogen and oxygen, respectively, and, when receiving the hydrogen and the oxygen, to generate electricity and water. The fuel cell is fluidly coupled to the steam system as the water source.

20 Claims, 3 Drawing Sheets

(56) References Cited

U.S. PATENT DOCUMENTS

| | | | |
|---|---|---|---|
| 7,986,052 | B2 | 7/2011 | Marconi |
| 8,623,566 | B2 | 1/2014 | Westenberger et al. |
| 9,059,440 | B2 | 6/2015 | Hotto |
| 10,308,366 | B2 | 6/2019 | Kupiszewski et al. |
| 10,731,554 | B2 * | 8/2020 | Lear, Jr. .................... F02C 3/04 |
| 10,774,741 | B2 * | 9/2020 | Sennoun ................. F02C 3/305 |
| 10,978,723 | B2 | 4/2021 | Lo et al. |
| 11,603,798 | B1 | 3/2023 | Terwilliger et al. |
| 11,724,815 | B2 * | 8/2023 | Mackin .................. B64D 41/00 |
| | | | 60/801 |
| 11,828,200 | B2 * | 11/2023 | Terwilliger ............... F01K 7/12 |
| 12,037,127 | B2 * | 7/2024 | Palmer ............. H01M 8/04014 |
| 2004/0219408 | A1 | 11/2004 | Hesse |
| 2005/0252214 | A1 * | 11/2005 | Goldmeer .............. B63H 21/17 |
| | | | 60/698 |
| 2009/0293494 | A1 * | 12/2009 | Hoffjann .............. B64D 35/025 |
| | | | 60/718 |
| 2021/0207500 | A1 * | 7/2021 | Klingels ................. F02C 3/305 |
| 2022/0364513 | A1 * | 11/2022 | Muldoon ................... F02C 3/22 |
| 2023/0010158 | A1 * | 1/2023 | Muldoon ............... B64D 37/30 |
| 2023/0150678 | A1 * | 5/2023 | Klingels ................ B64D 33/04 |
| | | | 244/55 |
| 2023/0258106 | A1 * | 8/2023 | Terwilliger ............. F01K 15/02 |
| | | | 60/775 |
| 2023/0258123 | A1 * | 8/2023 | Partheepan ............... F02C 1/00 |
| | | | 60/772 |
| 2024/0200494 | A1 * | 6/2024 | Lear ...................... F02B 37/013 |
| 2024/0343401 | A1 * | 10/2024 | Miftakhov ........... B64D 27/355 |

OTHER PUBLICATIONS

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

V. Madonna et al., "Electrical Power Generation in Aircraft: Review, Challenges, and Opportunities," in IEEE Transactions on Transportation Electrification, vol. 4, No. 3, pp. 646-659, Sep. 2018.

U.S. Appl. No. 18/366,249, filed Aug. 7, 2023.
U.S. Appl. No. 18/463,774, filed Sep. 8, 2023.
U.S. Appl. No. 18/463,782, filed Sep. 8, 2023.
U.S. Appl. No. 18/468,189, filed Sep. 15, 2023.
U.S. Appl. No. 18/468,198 filed Sep. 15, 2023.
U.S. Appl. No. 18/366,256, filed Aug. 7, 2023.
U.S. Appl. No. 18/451,429, filed Aug. 17, 2023.
U.S. Appl. No. 18/515,881, filed Nov. 21, 2023.
U.S. Appl. No. 18/515,864, filed Nov. 21, 2023.

* cited by examiner

PROPULSION AND ELECTRICAL SYSTEM FOR AN AIRCRAFT INCLUDING A FUEL CELL AND TURBINE ENGINE WITH A STEAM SYSTEM

TECHNICAL FIELD

The present disclosure relates to relates generally to turbine engines, particularly, turbine engines for aircraft.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
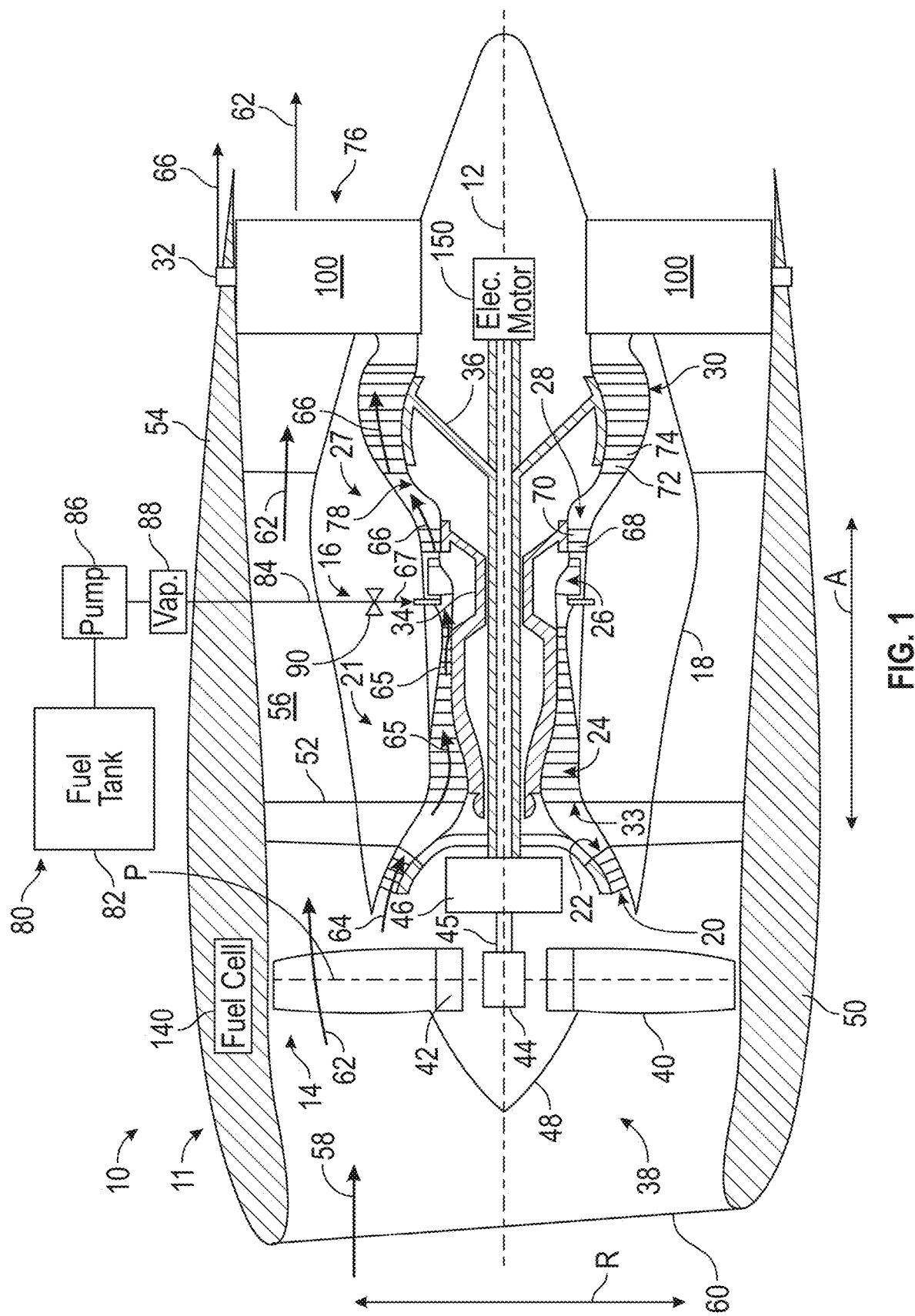
FIG. 1 is a schematic cross-sectional diagram of a propulsion and electrical system including turbine engine with a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the the present disclosure.

As used herein, the terms "first," "second," and the like, may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component.

As used herein, a "bypass ratio" of a turbine engine is a ratio of bypass air through a bypass of the turbine engine to core air through a core inlet of a turbo-engine of the turbine engine.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section of the turbine engine to generate combustion gases for driving a turbine in the core section. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. A portion of the water vapor used to produce the steam can be extracted from the combustion gases. After flowing through the steam turbine, the steam may be injected into a core air flow path. The steam turbine inputs additional work into the turbine engine and the steam that is injected into the core engine increases a mass flow through the turbine engine. The turbine engine provides propulsion for the aircraft.

The aircraft also may have onboard a fuel cell that is used to produce electricity for various uses. The fuel cell includes an anode and a cathode, separated by an electrolyte. A fuel, such as hydrogen, is fed to the anode, and oxygen, such as within air is fed to the cathode. The anode can include a catalyst that separates hydrogen molecules into protons and electrons, which take different paths to the cathode. The electrons go through an external circuit, creating a flow of electricity. The protons migrate through the electrolyte to the cathode, where they unite with the oxygen and the electrons to produce water and heat. The fuel cell and the turbine engine discussed herein form a propulsion and electrical system for an aircraft. The fuel cell can be fluidly coupled to the steam system of the turbine engine and the water produced by the fuel cell can be used as part of the water in the steam system to generate steam. Additionally or alternatively, the water of the steam system can be used to cool the fuel cell.

Referring now to the drawings, FIG. 1 is a schematic cross-sectional diagram of a propulsion and electrical system 10 for an aircraft. The propulsion and electrical system 10 includes a turbine engine 11 and a fuel cell 140. The turbine engine 11 includes a steam system 100. FIG. 1 is, more specifically, a schematic cross-sectional diagram of the turbine engine 11 taken along a longitudinal centerline axis 12 (provided for reference) of the turbine engine 11, according to an embodiment of the present disclosure. As shown in FIG. 1, the turbine engine 11 has an axial direction A (extending parallel to the longitudinal centerline axis 12) and a radial direction R that is normal to the axial direction A. In general, the turbine engine 11 includes a fan section 14 and a turbo-engine 16 disposed downstream from the fan section 14.

The turbo-engine 16 includes a compressor section 21, a combustor 26, and a turbine section 27. The turbo-engine 16 depicted is substantially enclosed within an outer casing 18 that is substantially tubular and defines a core inlet 20. As depicted, the core inlet 20 is annular. As schematically shown in FIG. 1, the compressor section 21 includes a booster or a low-pressure compressor (LPC) 22 followed downstream by a high-pressure compressor (HPC) 24. The combustor 26 is downstream of the compressor section 21. The turbine section 27 is downstream of the combustor 26 and includes a high-pressure turbine (HPT) 28, followed downstream by a low-pressure turbine (LPT) 30. The turbo-engine 16 further includes one or more core exhaust nozzles 32 that are downstream of the turbine section 27, a high-pressure (HP) shaft 34 or a spool, and a low-pressure (LP) shaft 36. The HP shaft 34 drivingly connects the HPT 28 to the HPC 24. The HPT 28 and the HPC 24 rotate in unison through the HP shaft 34. The LP shaft 36 drivingly connects the LPT 30 to the LPC 22. The LPT 30 and the LPC 22 rotate in unison through the LP shaft 36. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 are rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 11 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 and, with the outer casing 18, defines a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 11, a volume of air 58 enters the turbine engine 11 through an inlet 60 of the nacelle 50 and/or the fan section 14. As the volume of air 58 passes across the fan blades 40, a first portion of air (bypass air 62) is routed into the bypass airflow passage 56, and a second portion of air (core air 64) is routed into the upstream section of the core air flow path 33 through the annular core inlet 20. The ratio between the first portion of air (bypass air 62) and the second portion of air (core air 64) is known as a bypass ratio. The pressure of the core air 64 is then increased by the LPC 22 compressing the core air 64 to generate compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via one or more stages of HPT stator vanes 68 and a plurality of HPT rotor blades 70 that are coupled to the HP shaft 34. This causes the HP shaft 34 to rotate, which supports operation of the HPC 24 (self-sustaining cycle). In this way, the combustion gases 66 do work on the HPT 28. The combustion gases 66 are then routed into the LPT 30 and expanded through the LPT 30. Here, a second portion of thermal energy and/or the kinetic energy is extracted from the combustion gases 66 via one or more stages of LPT stator vanes 72 and a plurality of LPT rotor blades 74 that are coupled to the LP shaft 36. This causes the LP shaft 36 to rotate, thereby supporting operation of the LPC 22 (self-sustaining cycle) and rotation of the fan 38 via the gearbox assembly 46. In this way, the combustion gases 66 do work on the LP turbine 30. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66, after being routed through the steam system 100 (as discussed below), are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 11, also providing propulsive thrust. The combustor 26, the HPT 28, the LPT 30, and the one or more core exhaust nozzles 32 at least partially define a hot gas path 78 for routing the combustion gases 66 through the turbo-engine 16.

As noted above, the compressed air 65 (i.e., the core air 64) is mixed with the fuel 67 in the combustor 26 to generate a fuel and air mixture, and combusted, generating combustion gases 66 (i.e., combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is unblended, for example, and referred to herein as hydrogen fuel. In some embodiments, the hydrogen fuel may be substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 11 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 11 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 11 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 11 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 11 depicted in FIG. 1 is by way of example only. In other exemplary embodiments, the turbine engine 11 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
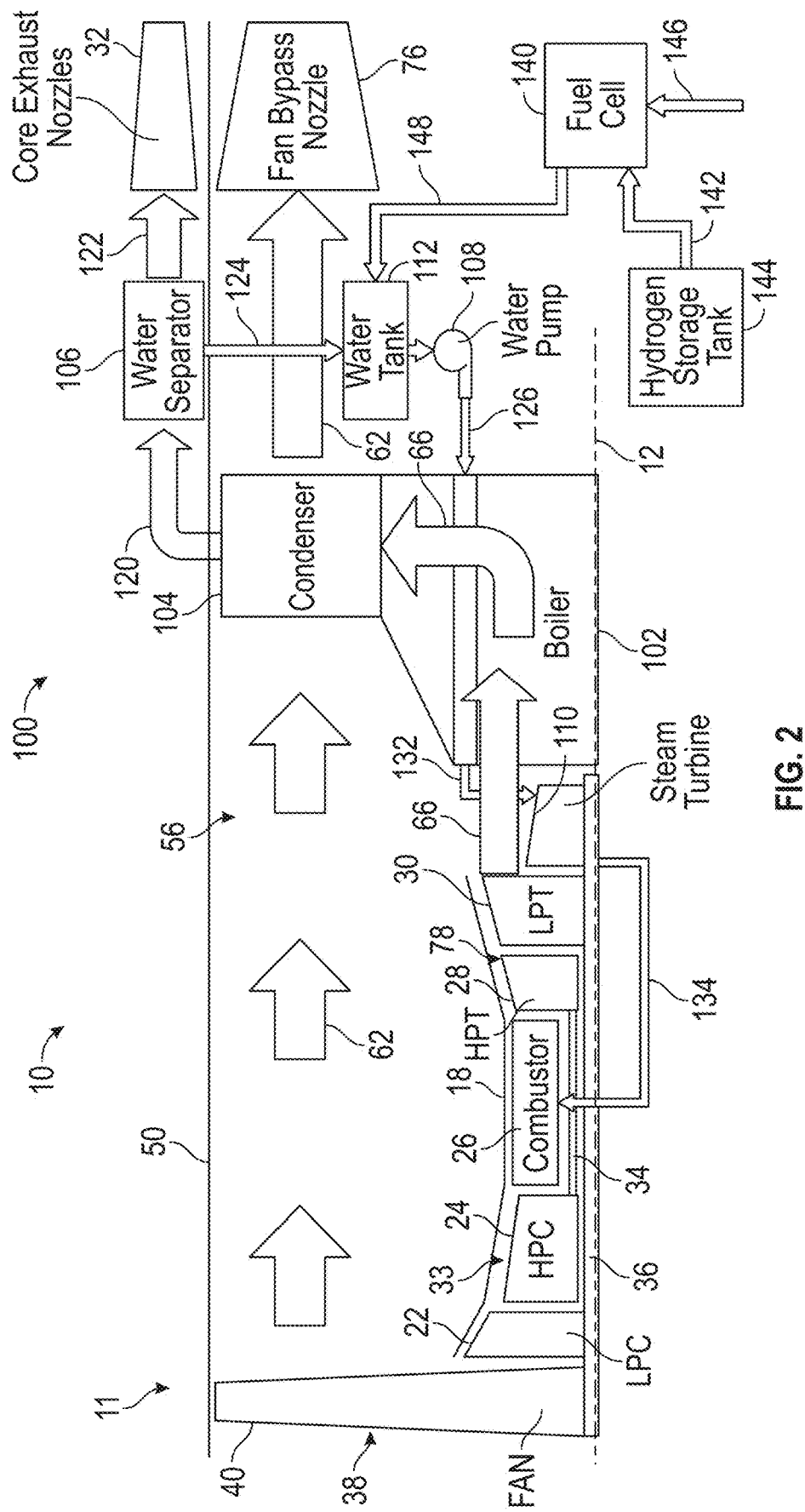
FIG. 2 is a schematic diagram of the propulsion and electrical system shown in FIG. 1, according to the present disclosure.

FIG. 2 is a schematic diagram of the propulsion and electrical system 10 including the turbine engine 11 and the steam system 100 of FIG. 1, according to the present disclosure. For clarity, the turbine engine 11 is shown schematically in FIG. 2 and some components are not shown in FIG. 2. The steam system 100 includes a boiler 102, a condenser 104, a water separator 106, a water pump 108, a steam turbine 110, and a water tank 112.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108 to receive supply water 126 from the water source, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below, to extract water as extracted water 124. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water (i.e., the extracted water 124) entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 11, such as, for example, radially inward of the nacelle 50, closer to the turbo-engine 16. The water separator 106 may be driven to rotate by one of the engine shafts, such as the HP shaft 34 or the LP shaft 36. As noted above, the boiler 102 receives liquid water (i.e., the supply water 126) from a water source to generate steam or water vapor. In the embodiment depicted in FIG. 2, the water source for the boiler 102 includes the condenser 104 and the water separator 106, individually or collectively, as the water source to provide supply water 126 that includes the extracted water 124.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the supply water 126 through the boiler 102 where the extracted water 124 is converted back to steam 132. This steam is sent through the steam turbine 110, and then injected into core air flow path 33, such as into the combustor 26.

The steam system 100 depicted in FIG. 2 includes the water tank 112 fluidly connected to the water separator 106 to collect the extracted water 124 condensed by the condenser 104 and separated by the water separator 106. The water tank 112 may thus be an accumulator or an accumulator tank. The water tank 112 can be positioned between the water separator 106 and the water pump 108. The water pump 108 can draw the supply water 126 from the water tank 112 and direct the supply water 126, at a desired flow rate, into the boiler 102. In some embodiments, the water tank 112 may include one or more drain lines, including an overflow line, fluidly connected thereto. These drain lines may be used to remove and to drain water from the water tank 112 and the steam system 100. In some embodiments, however, the water tank 112 may be omitted from the steam system 100.

In operation, the combustion gases 66, also referred to as exhaust, flow from the LPT 30 into the boiler 102. The combustion gases 66 transfer heat into the supply water 126 (e.g., in liquid form) within the boiler 102, as detailed further below. The combustion gases 66 then flow into the condenser 104. The condenser 104 condenses the water (e.g., in liquid form) as extracted water 124 from the combustion gases 66. The bypass air 62 flows through the bypass airflow passage 56 and over or through the condenser 104 and extracts heat from the combustion gases 66, cooling the combustion gases 66 and condensing the extracted water 124 from the combustion gases 66, to generate an exhaust-water mixture 120 that includes the extracted water 124. The bypass air 62 is then exhausted out of the turbine engine 11 through the fan bypass nozzle 76 to generate thrust, as detailed above. The condenser 104 thus may be positioned in bypass airflow passage 56.

The exhaust-water mixture 120 flows into the water separator 106. The water separator 106 separates the extracted water 124 from the exhaust of the exhaust-water mixture 120 to generate separate exhaust 122 and the extracted water 124. The exhaust 122 is exhausted out of the turbine engine 11 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 120, and the exhaust 122 through the steam system 100 of the turbine engine 11.

The extracted water 124 flows from the water separator 106 into the water tank 112, and then the water pump 108 pumps the supply water 126 (e.g., in liquid form) by drawing water from the water tank 112 through one or more water lines (as indicated by the arrow for the supply water 126 in FIG. 2) and the supply water 126 flows through the boiler 102. As the supply water 126 flows through the boiler 102, the combustion gases 66 flowing through the boiler 102 transfer heat into the water 124 to vaporize the supply water 126 and to generate steam 132 (e.g., vapor). The steam turbine 110 includes one or more stages of steam turbine blades (not shown) and steam turbine stators (not shown). The steam 132 flows from the boiler 102 into the steam turbine 110, through one or more steam lines (as indicated by the arrow for the steam 132 in FIG. 2), causing the steam turbine blades of the steam turbine 110 to rotate, which generates additional work in an output shaft (e.g., one of the engine shafts) connected to the turbine blades of the steam turbine 110.

As noted above, the turbo-engine 16 includes shafts, also referred to as engine shafts, coupling various rotating components of the turbo-engine 16 and other thrust producing components, such as the fan 38. In the turbo-engine 16 shown in FIG. 1, these engine shafts include the HP shaft 34 and the LP shaft 36. The steam turbine 110 is coupled to one of the engine shafts of the turbo-engine 16, such as the HP shaft 34 or the LP shaft 36. In the illustrated embodiment, the steam turbine 110 is coupled to the LP shaft 36. As the steam 132 flows from the boiler 102 through the steam turbine 110, the kinetic energy of this gas is converted by the steam turbine 110 into mechanical work in the LP shaft 36. The reduced temperature steam (as steam 134) exiting the steam turbine 110 is then injected into the core air flow path 33, such as into the combustor 26, upstream of the combustor 26, or downstream of the combustor 26. The steam 134 flows through one or more steam lines from the steam turbine 110 to the core air flow path 33. The steam 134 injected into the core air flow path 33 adds mass flow to the core air 64 such that less core air 64 is needed to produce the same amount of work through the turbine section 27. In this way, the steam system 100 extracts additional work from the heat in the exhaust gas that would otherwise be wasted. The steam 134 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the steam system 100 recovers approximately 70% of the water 124 and converts the water 124 into the steam 132. The steam turbine 110 has a pressure expansion ratio in a range of 2:1 to 6:1, the LPT 30 has a pressure expansion ratio in a range of 4.5:1 to 28:1, and the steam 134 contributes to 20% to 50% of the mass flow through the core air flow path 33. The steam turbine 110 expands the steam 132, thereby reducing the energy of the steam 134 exiting the steam turbine 110 and reducing the temperature of the steam 134 to approximately a temperature of the compressed air 65 (see FIG. 1)

that is discharged from the HPC 24. Such a configuration enables the steam 134 to reduce hot spots in the combustor 26 from the combustion of the fuel (e.g., in particular, when the fuel is supercritical hydrogen or gaseous hydrogen).

The steam 134 injected into the core air flow path 33 also enables the HPT 28 to have a greater energy output with fewer stages of the HPT 28 as compared to HPTs without the benefit of the present disclosure. For example, the additional mass flow from the steam 134 through the turbine section 27 helps to produce a greater energy output. In this way, the HPT 28 may only have one stage capable of sustainably driving a greater number of stages of the HPC 24 (e.g., ten, eleven, or twelve stages of the HPC 24) due to the higher mass flow (resulting from the steam injection) exiting the combustor 26. The steam 134 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 132, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 11 as compared to HPCs and turbine engines without the benefit of the present disclosure. Further, the HPC 24 may have a reduced throat area due to the added mass flow in the turbo-engine 16 provided by the steam 132, 128 injected into the turbo-engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes are variable stator vanes, and the one or more compressor bleed valves help to balance the air flow (e.g., the compressed air 65) through all stages of the HPC 24. Such a balance, in combination with the steam 134 injected into the core air flow path 33, enables the number of stages of the HPC 24 to include ten to twelve stages for compression ratios to be greater than 20:1, and, preferably, in a range of 20:1 to 40:1.

The greater the bypass ratio, the greater the overall efficiency of the turbine engine (e.g., less fuel needed to produce more thrust). The bypass ratio of ducted fan turbine engines is typically limited due to the nacelle. For example, a size of the bypass airflow passage 56 is dependent on a size of the nacelle 50. Further, the turbo-engine 16 is difficult to reduce in size while achieving the same thrust level and amount of work done by the turbo-engine 16 due to the compressors (e.g., LPC 22 and HPC 24) not being able to achieve the same amount of compression of the core air 61 if the size of the compressors is reduced. Thus, the bypass ratio of ducted fan turbine engines is typically less than about 12:1. The additional work that is extracted by the steam system 100 and the steam 134 injected into the core air flow path 33 enables a size of the turbo-engine 16 (FIG. 1) to be reduced, which increases the bypass ratio of the turbine engine 11, as compared to turbine engines without the benefit of the present disclosure. In this way, the turbine engine 11 has a bypass ratio greater than 18:1, preferably, in a range of 18:1 to 100:1, more preferably, in a range of 25:1 to 85:1, and, most preferably, in a range of 28:1 to 70:1. In this way, the steam system 100 can enable an increased bypass ratio in which the turbine engine 11 can move a greater mass of air through the bypass, reducing the pressure ratio of the fan 38 and increasing the efficiency of the turbine engine 11 as compared to turbine engines without the benefit of the present disclosure.

In addition to the turbine engine 11 with the steam system 100, the propulsion and electrical system 10 discussed herein also includes a fuel cell 140 for producing electricity. The fuel cell 140 can be a part of the turbine engine 11, and, as schematically depicted in FIG. 1, the fuel cell 140 can be located within a housing for the turbine engine 11, such as, for example, within the nacelle 50. However, the fuel cell 140 can be positioned elsewhere on the aircraft, such as within the fuselage or the pylon. The fuel cell 140 is used to produce electricity and power various electrical systems of the aircraft including, in some embodiments, the turbine engine 11. The fuel cell 140 discussed herein may produce, for example, at least ten percent, and up to as much as fifty percent of the electrical demand from the electrical systems of the aircraft at an operating condition. The fuel cell 140 is not necessarily sized to produce the electrical demand at all operating conditions. For example, in some embodiments, the operating condition is ground idle, taxi, or landing. In other embodiments, the operating conditions is cruise, such as cruise at an altitude between 30,000 feet to 40,000 feet. In still other embodiments, the operating condition is main engine start or takeoff at sea level. The fuel cell 140 discussed herein can be sized to produce, for example, from four kilowatts (4 kW) to two hundred fifty kilowatts (250 kW), such as from four kilowatts (4 kW) to ten kilowatts (10 kW), from ten kilowatts (10 kW) to fifty kilowatts (50 kW), or from fifty kilowatts (50 kW) to two hundred fifty kilowatts (250 kW). The power demands may vary based on the size of the aircraft and these narrower ranges may be for small regional jets (e.g., Bombardier CRJ700), a narrow body regional jet (e.g., a Boeing 737 or Airbus A320), or a widebody aircraft (e.g., a Boeing 787 or Airbus A380), respectively. In some embodiments, the fuel cell 140 may replace an auxiliary power unit. Using the fuel cell 140 can help to reduce the size and the weight of the turbine engine 11.

The amount of water produced by such fuel cells 140 will depend upon the efficiency of the fuel cell stack. Fuel cells 140 may have an efficiency from forty percent (40%) to fifty percent (50%). For a fuel cell that is forty percent (40%) efficient, the fuel cell 140 discussed herein can be sized to produce, for example, from two and five tenths liters per hour (2.5 l/hr) to one hundred seventy liters per hour (170 l/hr), such as from two and five tenths liters per hour (2.5 l/hr) to seven liters per hour (7 l/hr), from seven liters per hour (7 l/hr) to thirty-five (35 l/hr), or from thirty-five (35 l/hr) to one hundred seventy liters per hour (170 l/hr). For a fuel cell that is forty percent (50%) efficient, the fuel cell 140 discussed herein can be sized to produce, for example, from two liters per hour (2 l/hr) to one hundred thirty-five liters per hour (135 l/hr), such as from two liters per hour (2 l/hr) to five and half per hour (5.5 l/hr), from five and half per hour (5.5 l/hr) to thirty (30 l/hr), or from thirty (30 l/hr) to one hundred thirty-five liters per hour (135 l/hr).

In some embodiments, the electricity produced by the fuel cell 140 may be used to drive an electric motor 150 connected to one of the engine shafts, such as the LP shaft 36, as shown in FIG. 1. The electric motor 150 is drivingly coupled to the engine shaft and, more specifically the LP shaft 36, as depicted in FIG. 1. The electric motor 150 is electrically coupled to the fuel cell 140 to receive electricity from the fuel cell 140. The fuel cell 140, via this electric motor 150, may thus be used to rotate the LP shaft and produce additional thrust and to assist the thermal engine portion of the turbine engine 11. Specifically, for the embodiment depicted, the electric motor 150 is co-axially mounted to LP shaft 36. As used herein, "co-axially" refers to the axes being aligned. In other embodiments, however, an axis of the electric motor 150 may be offset radially from the axis of the LP shaft 36 and further may be oblique to the axis of the LP shaft 36, such that the electric motor 150 can be positioned at other locations at least partially inward of the core air flow path 33. The electric motor 150 can be positioned at least partially within or aft of the turbine section 27 along the axial direction A of the turbine engine 11.

Referring back to FIG. 2, the fuel cell 140 includes an anode and a cathode, separated by an electrolyte. A fuel, such as hydrogen, is fed to the anode. The hydrogen feed to the anode is referred to herein as fuel cell hydrogen 142. The fuel cell hydrogen 142 is provided from a hydrogen source, such as a hydrogen storage tank 144. As noted above, the fuel tank 82 may be used to store hydrogen and the discussion of the fuel tank 82 also applies to the hydrogen storage tank 144. The hydrogen storage tank 144 can be a separate storage tank for storing hydrogen onboard the aircraft in various forms, but, when the fuel 67 combusted in the combustor 26 is hydrogen, the hydrogen storage tank 144 for the fuel cell 140 can be the fuel tank 82. As with the fuel 67 discussed above, a pump, vaporizer, or both can be used to supply the fuel cell hydrogen 142 to the fuel cell 140.

Oxygen is fed to the cathode from an oxygen source. The oxygen can be oxygen that is within air, referred to herein as fuel cell air 146, and the fuel cell air 146 can be fed to the fuel cell 140 from a suitable air source (an oxygen source) to provide the oxygen to the cathode of the fuel cell 140. The air source can be air from within the turbine engine 11, such as the bypass air 62 or core air 64, including compressed air 65. In other embodiments, however, the air source may be ambient air flowing around the aircraft. For example, when the fuel cell 140 is positioned within the body of the aircraft (e.g., fuselage), such as in place of the auxiliary power unit, the fuel cell 140 may be located in the tail of the aircraft with an air inlet at the base of the tail. If the fuel cell 140 is located in the nacelle 50 surrounding the turbine engine 11, an air scoop can be placed on the exterior of the nacelle 50 in the vicinity of the fuel cell 140.

Within the fuel cell 140, the anode can include a catalyst that separates hydrogen molecules into protons and electrons, which take different paths to the cathode. The electrons go through an external circuit, creating a flow of electricity. The protons migrate through the electrolyte to the cathode, where they unite with the oxygen and the electrons to produce water and heat. The water produced by the fuel cell 140 is referred to herein as produced water 148. The supply water 126 can include the produced water 148, and the water source for the boiler 102 includes the fuel cell 140. The fuel cell 140 is fluidly connected to the boiler 102 such as via the water pump 108. More specifically, as depicted in FIG. 2, the fuel cell 140 is fluidly connected to the water tank 112 to provide the produced water 148 to the water tank 112. The water pump 108 then draws the supply water 126 from the water tank 112, which can include water provided by one or both of the combustion gases 66 (i.e., the extracted water 124) and the fuel cell 140 (i.e., the produced water 148). When the supply water 126 includes both the extracted water 124 and the produced water 148, using the produced water 148 reduces the amount of extracted water 124 needed in order to provide equivalent performance to a steam system that does not use the produced water 148. By reducing the amount of extracted water 124 needed for the system, the size of the condenser 104 can be reduced, reducing the weight of the steam system 100 and turbine engine 11. Based on the sizes of fuel cell 140 discussed above and the corresponding aircraft size and energy demands, in some embodiments, the fuel cell 140 can provide from five percent (5%) to ten percent (10%) of the water and accordingly the ratio of produced water 148 to extracted water 124 may be from 1:20 to 1:10.

As discussed above, by leveraging water generated by the fuel cell 140 (i.e., produced water 148) that would otherwise be wasted, the size of the condenser 104 and water separator 106 can be reduced by, for example, five percent (5%) to ten percent (10%). Also, additional water does not have to be carried onboard, and weight is further reduced by producing electrical power from the fuel cell 140 rather than a typical high-power generator. As such, the fuel cell 140 enables electrical power to be generated without the high-power generator and also produces water (i.e., produced water 148) that can be routed to the turbine engine 11 and, more specifically, a steam system 100 to form steam.

Figure 3:
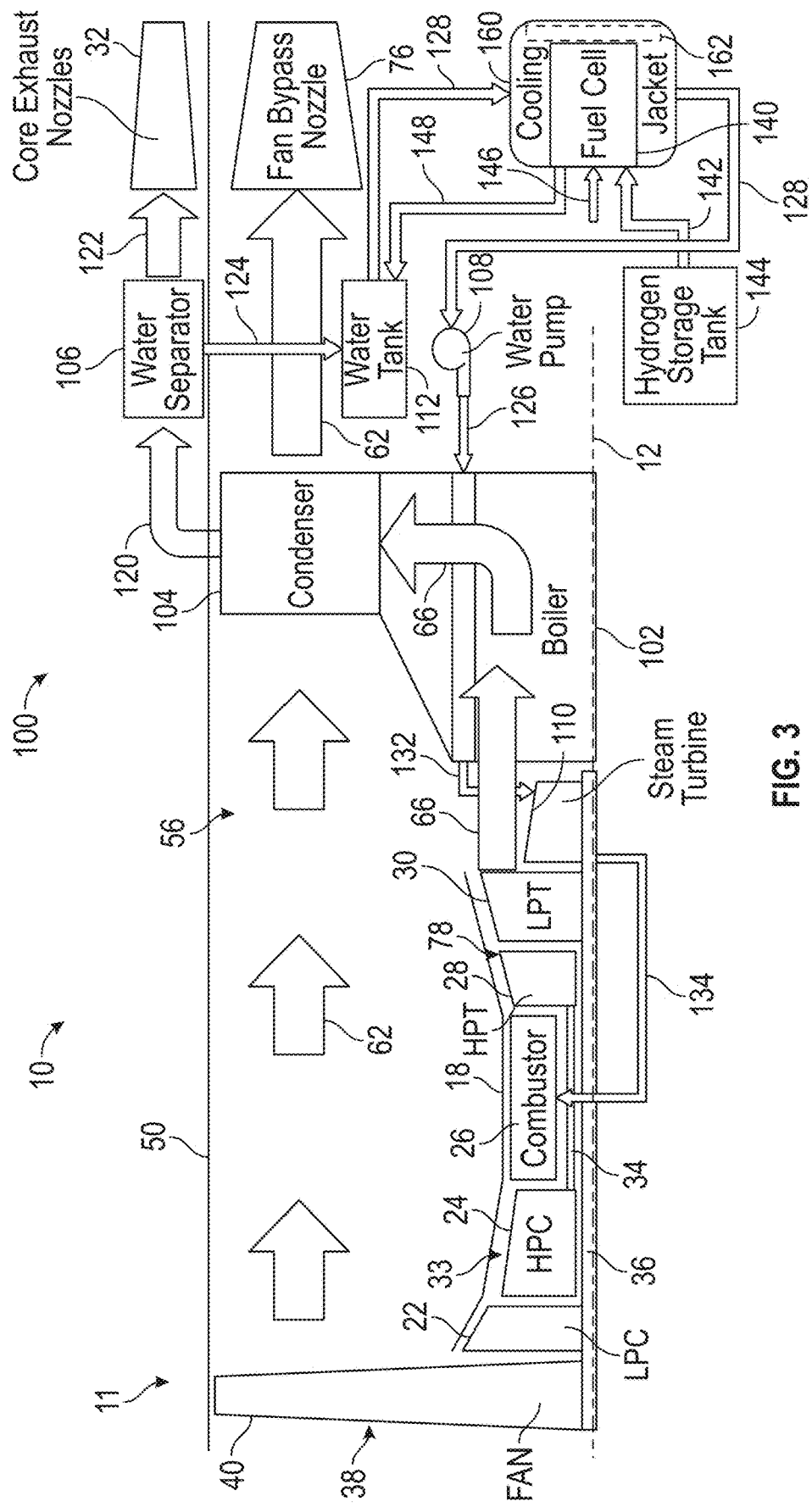
FIG. 3 is a schematic diagram of a propulsion and electrical system according to another embodiment of the present disclosure.

FIG. 3 is a schematic diagram of a propulsion and electrical system 210 according to another embodiment of the present disclosure. The propulsion and electrical system 210 shown in FIG. 3 is similar to the propulsion and electrical system 10 discussed above with reference to FIGS. 1 and 2, and the same reference numerals are used for the same or similar components. The discussion of these components above applies here. As noted above, the fuel cell 140 also produces heat as part of the process to produce electricity. The fuel cell 140 includes a heat sink to extract heat from the fuel cell 140 and to cool the fuel cell 140. The heat sink is a heat exchanger and, more specifically, a cooling jacket 160 including a fluid passage (referred to herein as a cooling jacket fluid passage 162) for a cooling fluid to flow therethrough. The cooling jacket 160 at least partially surrounds the fuel cell 140 to extract heat therefrom.

In the embodiment depicted in FIG. 3, the cooling fluid of the cooling jacket 160 is at least a portion of the supply water 126. In some embodiments, a portion of the supply water 126 may bypass the cooling jacket fluid passage 162 of the cooling jacket 160. The supply water 126 flows from the water tank 112 through the cooling jacket fluid passage 162 of the cooling jacket 160, where the supply water 126 extracts heat from the fuel cell 140, cooling the fuel cell 140 and heating the supply water 126. Then, the supply water 126 is directed by the water pump 108 to the boiler 102 in the manner discussed above. The steam system 100 thus is thermally coupled to the heat sink of the fuel cell 140 to receive heat from the fuel cell 140 and to heat the supply water 126. In FIG. 3, the fuel cell 140 is shown as providing the produced water 148 to the water tank 112, but, in other embodiments, this aspect can be omitted.

Embodiments discussed herein disclose propulsion and electrical systems 10, 210 that include a fuel cell 140 and a turbine engine 11 with a steam system 100. The fuel cell 140 can provide produced water 148 that is used to produce steam for the steam system 100, reducing the size of and the weight of some of the components of the steam system 100, such as the condenser 104. Additionally or alternatively, water, such as extracted water 124 from the combustion gases 66 that is used in the steam system 100, can also be used to cool the fuel cell 140. Further aspects of the present disclosure are provided by the subject matter of the following clauses.

A propulsion and electrical system for an aircraft includes a fuel cell and a turbine engine. The fuel cell fluidly is coupled to a hydrogen source and an oxygen source to receive hydrogen and oxygen, respectively, and, when receiving the hydrogen and the oxygen, generate electricity and water as produced water. The turbine engine includes a turbo-engine, a fan having a fan shaft coupled to the turbo-engine, and a steam system. The turbo-engine includes a combustor, an engine shaft, and a turbine. The combustor is located in a core air flow path to receive compressed air and is fluidly coupled to a fuel source to receive fuel. The fuel is injected into the combustor to mix with the compressed air to generate a fuel and air mixture, and the fuel and air mixture is combusted in the combustor to generate combustion gases. The turbine is located downstream of the combustor to receive the combustion gases, and the turbine is drivingly coupled to the engine shaft and rotated in response to receiving the combustion gases. The steam system includes a boiler fluidly coupled to a water source to receive supply water and to vaporize the supply water to generate steam. The water source includes the fuel cell, and the supply water includes the produced water. The steam system is fluidly coupled to the core air flow path to inject the steam into the core air flow path.

A propulsion and electrical system for an aircraft includes a fuel cell and a turbine engine. The fuel cell fluidly is coupled to a hydrogen source and an oxygen source to receive hydrogen and oxygen, respectively, and, when receiving the hydrogen and the oxygen, to generate electricity and water as produced water. The turbine engine includes a turbo-engine, a fan having a fan shaft coupled to the turbo-engine, and a steam system. The turbo-engine includes a combustor, an engine shaft, and a turbine. The combustor is located in a core air flow path to receive compressed air and fluidly coupled to a fuel source to receive fuel. The fuel is injected into the combustor to mix with the compressed air to generate a fuel and air mixture, and the fuel and air mixture is combusted in the combustor to generate combustion gases. The turbine is located downstream of the combustor to receive the combustion gases, and the turbine is drivingly coupled to the engine shaft and rotated in response to receiving the combustion gases. The steam system extracts water as extracted water from the combustion gases. The steam system includes a boiler and a steam turbine. The boiler is fluidly coupled to a water source to receive supply water and to vaporize the supply water to generate steam. The water source includes the fuel cell and the combustion gases, and the supply water includes the produced water and the extracted water. The steam turbine is fluidly coupled to the boiler to receive the steam from the boiler. The steam turbine is drivingly coupled to the engine shaft and rotated in response to receiving the steam.

A propulsion and electrical system for an aircraft includes a fuel cell and a turbine engine. The fuel cell fluidly is coupled to a hydrogen source and an oxygen source to receive hydrogen and oxygen, respectively, and, when receiving the hydrogen and the oxygen, generate electricity and water as produced water. The fuel cell includes a heat sink to extract heat from the fuel cell. The turbine engine includes a turbo-engine, a fan having a fan shaft coupled to the turbo-engine, and a steam system. The turbo-engine includes a combustor, an engine shaft, and a turbine. The combustor is located in a core air flow path to receive compressed air and is fluidly coupled to a fuel source to receive fuel. The fuel is injected into the combustor to mix with the compressed air to generate a fuel and air mixture, and the fuel and air mixture is combusted in the combustor to generate combustion gases. The turbine is located downstream of the combustor to receive the combustion gases, and the turbine is drivingly coupled to the engine shaft and rotated in response to receiving the combustion gases. The steam system extracts water as extracted water from the combustion gases. The steam system includes a boiler and a steam turbine. The boiler is fluidly coupled to a water source to receive supply water and to vaporize the supply water to generate steam. The water source includes the combustion gases, and the supply water includes the extracted water. The steam system is thermally coupled to the heat sink of the fuel cell to receive heat from the fuel cell and to heat the supply water. The steam turbine is fluidly coupled to the boiler to receive the steam from the boiler. The steam turbine is drivingly coupled to the engine shaft and rotated in response to receiving the steam.

The propulsion and electrical system of the preceding clause, wherein the steam system is fluidly coupled to the fuel cell, the water source including the fuel cell and the supply water including the produced water.

The propulsion and electrical system of any preceding clause, wherein the steam system is fluidly coupled to the core air flow path to inject the steam into the core air flow path.

The propulsion and electrical system of any preceding clause, wherein the turbine engine further includes a housing enclosing at least a portion of the turbine engine, the fuel cell being located in the housing.

The propulsion and electrical system of any preceding clause, wherein the turbine engine further includes a nacelle circumferentially surrounding the fan, the fuel cell being located in the nacelle.

The propulsion and electrical system of any preceding clause, wherein the steam system is fluidly coupled to combustor to inject the steam into the combustor.

The propulsion and electrical system of any preceding clause, wherein the fuel is hydrogen and the fuel source is a hydrogen storage tank.

The propulsion and electrical system of the preceding clause, wherein the hydrogen source for the fuel cell is the hydrogen storage tank.

The propulsion and electrical system of any preceding clause, wherein the steam system further includes an accumulator tank, the accumulator tank being fluidly connected to the fuel cell to receive the produced water from the fuel cell and fluidly connected to the boiler to provide the supply water to the boiler.

The propulsion and electrical system of the preceding clause, wherein the steam system further includes a water pump in fluid communication with the accumulator tank and with the boiler to direct a flow of supply water from the accumulator tank into the boiler.

The propulsion and electrical system of any preceding clause, wherein the steam system extracts water as extracted water from the combustion gases, the water source including the combustion gases and the supply water including the extracted water.

The propulsion and electrical system of the preceding clause, wherein the turbo-engine further includes a hot gas path for routing the combustion gases through the turbo-engine, and The propulsion and electrical system of any preceding clause, wherein the steam system further includes an accumulator tank that is fluidly connected to the hot gas path to receive the extracted water from the hot gas path, fluidly connected to the fuel cell to receive the produced water from the fuel cell, and fluidly connected to the boiler to provide the supply water to the boiler.

The propulsion and electrical system of any preceding clause, wherein the steam system further includes a water pump in fluid communication with the accumulator tank and with the boiler to direct a flow of supply water from the accumulator tank into the boiler.

The propulsion and electrical system of any preceding clause, wherein the steam system further includes a steam turbine fluidly coupled to the boiler to receive the steam from the boiler, the steam turbine being drivingly coupled to the engine shaft and rotated in response to receiving the steam.

The propulsion and electrical system of the preceding clause, wherein the steam is injected into the core air flow path downstream of the steam turbine after the steam flows through the steam turbine.

The propulsion and electrical system of any preceding clause, wherein the fuel cell includes a heat sink to extract heat from the fuel cell and the steam system is thermally coupled to the heat sink of the fuel cell to receive heat from the fuel cell and to heat the supply water.

The propulsion and electrical system of the preceding clause, wherein the heat sink is a heat exchanger including a fluid passage for the supply water to flow therethrough.

The propulsion and electrical system of the preceding clause, wherein the heat exchanger is a water jacket at least partially surrounding the fuel cell.

The propulsion and electrical system of any preceding clause, wherein the steam system further includes a condenser downstream of the turbine to receive the combustion gases and to condense the extracted water from the combustion gases.

The propulsion and electrical system of any preceding clause, wherein the condenser is located downstream of the boiler with respect to the flow of combustion gases.

The propulsion and electrical system of any preceding clause, wherein the turbine engine further includes a nacelle circumferentially surrounding the fan, and the nacelle defines a bypass airflow passage between the nacelle and the turbo-engine.

The propulsion and electrical system of any preceding clause, wherein the fan includes a plurality of fan blades that rotates to generate a volume of air that is split and flowing into the bypass airflow passage as bypass air and flows into the core air flow path as core air, and The propulsion and electrical system of any preceding clause, wherein the condenser is located in the bypass airflow passage for bypass air to cool the combustion gases and to condense the water from the combustion gases.

The propulsion and electrical system of any preceding clause, wherein the condenser generates an exhaust-water mixture including the extracted water.

The propulsion and electrical system of any preceding clause, wherein the steam system further includes a water separator located downstream of the condenser, the water separator separating the extracted water from an exhaust-water mixture.

The propulsion and electrical system of any preceding clause, wherein the water separator is a cyclonic separator.

The propulsion and electrical system of any preceding clause, wherein the turbine is a high-pressure turbine.

The propulsion and electrical system of any preceding clause, wherein the turbo-engine includes a high-pressure compressor positioned in the core air flow path upstream of the combustor to generate the compressed air.

The propulsion and electrical system of any preceding clause, wherein the engine shaft is a high-pressure shaft.

The propulsion and electrical system of any preceding clause, wherein the high-pressure compressor is driven by the high-pressure shaft to compress the core air flowing through the core air flow path and to generate the compressed air.

The propulsion and electrical system of any preceding clause, further comprising an electric motor coupled to the engine shaft, the electric motor electrically coupled to the fuel cell to receive electricity from the fuel cell.

The propulsion and electrical system of any preceding clause, wherein the turbo-engine includes a low-pressure shaft.

The propulsion and electrical system of the preceding clause, wherein the low-pressure shaft is the engine shaft.

The propulsion and electrical system of any preceding clause, wherein the turbo-engine includes a low-pressure compressor positioned in the core air flow path upstream of the combustor to generate the compressed air.

The propulsion and electrical system of the preceding clause, wherein the low-pressure compressor positioned in the core air flow path upstream of the high-pressure compressor.

The propulsion and electrical system of any preceding clause, wherein the turbo-engine includes a low-pressure turbine positioned in the core air flow path downstream of the high-pressure turbine to receive the combustion gases and to cause the turbine to rotate.

The propulsion and electrical system of any preceding clause, wherein the turbo-engine includes a low-pressure shaft, the low-pressure turbine coupled to the low-pressure shaft.

The propulsion and electrical system of any preceding clause, wherein the engine shaft is a low-pressure shaft and the turbine is a low-pressure turbine.

The propulsion and electrical system of any preceding clause, wherein the fan shaft is coupled to the low-pressure shaft to be driven by the low-pressure shaft.

The propulsion and electrical system of any preceding clause, further comprising a nacelle circumferentially surrounding the fan.

The propulsion and electrical system of any preceding clause, wherein the fan includes a plurality of fan blades that rotates to generate a volume of air.

The propulsion and electrical system of any preceding clause, wherein the nacelle defines a bypass airflow passage between the nacelle and the turbo-engine. The volume of air from the fan is split and flows into the bypass airflow passage as bypass air and flows into the core air flow path as the core air.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A propulsion and electrical system for an aircraft, the propulsion and electrical system comprising:
a fuel cell fluidly coupled to a hydrogen source and an oxygen source to receive hydrogen and oxygen, respectively, and, when receiving the hydrogen and the oxygen to generate electricity and water as produced water; and
a turbine engine comprising:
a turbo-engine including:
a combustor located in a core air flow path to receive compressed air and fluidly coupled to a fuel source to receive fuel, the fuel being injected into the combustor to mix with the compressed air to generate a fuel and air mixture, the fuel and air mixture being combusted in the combustor to generate combustion gases;
an engine shaft; and
a turbine located downstream of the combustor to receive the combustion gases, the turbine drivingly coupled to the engine shaft and rotated in response to receiving the combustion gases;
a fan having a fan shaft coupled to the turbo-engine; and
a steam system including:
a boiler fluidly coupled to a water source to receive supply water as a liquid and to vaporize the supply water to generate steam, the boiler being fluidly coupled to the core air flow path to inject the steam into the core air flow path;
a condenser downstream of the turbine to receive the combustion gases and to generate an exhaust-water mixture; and
a water separator located downstream of the condenser to separate water as extracted water from the exhaust-water mixture,
wherein the water source includes the fuel cell and the combustion gases,
wherein the supply water includes the produced water and the extracted water, and
wherein the condenser, the water separator, and the fuel cell are sized such that the ratio of produced water to extracted water in the supply water is from 1:20 to 1:10.

2. The propulsion and electrical system of claim 1, wherein the turbine engine further includes a housing enclosing at least a portion of the turbine engine, the fuel cell being located in the housing.

3. The propulsion and electrical system of claim 1, wherein the turbine engine further includes a nacelle circumferentially surrounding the fan, the fuel cell being located in the nacelle.

4. The propulsion and electrical system of claim 1, wherein the steam system is fluidly coupled to combustor to inject the steam into the combustor.

5. The propulsion and electrical system of claim 1, further comprising an electric motor drivingly coupled to the engine shaft, and electrically coupled to the fuel cell to receive electricity from the fuel cell.

6. The propulsion and electrical system of claim 1, wherein the fuel is hydrogen and the fuel source is a hydrogen storage tank.

7. The propulsion and electrical system of claim 6, wherein the hydrogen source for the fuel cell is the hydrogen storage tank.

8. The propulsion and electrical system of claim 1, wherein the steam system further includes an accumulator tank, the accumulator tank being fluidly connected to the fuel cell to receive the produced water from the fuel cell and fluidly connected to the boiler to provide the supply water to the boiler, the water source including the accumulator tank.

9. The propulsion and electrical system of claim 8, wherein the steam system further includes a water pump in fluid communication with the accumulator tank and with the boiler to direct a flow of supply water from the accumulator tank into the boiler.

10. The propulsion and electrical system of claim 1, wherein the turbine engine further includes a nacelle circumferentially surrounding the fan, and the nacelle defines a bypass airflow passage between the nacelle and the turbo-engine,
wherein the fan includes a plurality of fan blades that rotates to generate a volume of air that is split and flowing into the bypass airflow passage as bypass air and flows into the core air flow path as core air, and
wherein the condenser is located in the bypass airflow passage for bypass air to cool the combustion gases and to condense the water from the combustion gases.

11. The propulsion and electrical system of claim 1, wherein the steam system further includes a steam turbine fluidly coupled to the boiler to receive the steam from the boiler, the steam turbine being drivingly coupled to the engine shaft and rotated in response to receiving the steam.

12. The propulsion and electrical system of claim 11, wherein the steam is injected into the core air flow path downstream of the steam turbine after the steam flows through the steam turbine.

13. A propulsion and electrical system of for an aircraft, the propulsion and electrical system comprising:
a fuel cell fluidly coupled to a hydrogen source and an oxygen source to receive hydrogen and oxygen, respectively, and, when receiving the hydrogen and the oxygen to generate electricity and water as produced water; and
a turbine engine comprising:
a turbo-engine including:
a combustor located in a core air flow path to receive compressed air and fluidly coupled to a fuel source to receive fuel, the fuel being injected into the combustor to mix with the compressed air to generate a fuel and air mixture, the fuel and air mixture being combusted in the combustor to generate combustion gases;
an engine shaft; and
a turbine located downstream of the combustor to receive the combustion gases, the turbine drivingly coupled to the engine shaft and rotated in response to receiving the combustion gases;
a fan having a fan shaft coupled to the turbo-engine; and
a steam system including a boiler fluidly coupled to a water source to receive supply water as a liquid and to vaporize the supply water to generate steam, the steam system being fluidly coupled to the core air flow path to inject the steam into the core air flow path,
wherein the steam system extracts water as extracted water from the combustion gases, the water source including the fuel cell and the combustion gases and the supply water including the produced water and the extracted water, and
wherein the fuel cell includes a heat sink to extract heat from the fuel cell and the steam system is thermally coupled to the heat sink of the fuel cell to receive heat from the fuel cell and to heat the supply water at a position upstream of the boiler relative to the flow of supply water.

14. The propulsion and electrical system of claim 13, wherein the turbo-engine further includes a hot gas path for routing the combustion gases through the turbo-engine, and wherein the steam system further includes an accumulator tank that is fluidly connected to the hot gas path to receive the extracted water from the hot gas path, fluidly connected to the fuel cell to receive the produced water from the fuel cell, and fluidly connected to the boiler to provide the supply water to the boiler, and wherein, relative to the flow of the supply water, the fuel cell is located downstream of the accumulator tank.

15. The propulsion and electrical system of claim 14, wherein the steam system further includes a water pump in fluid communication with the accumulator tank and with the boiler to direct a flow of supply water from the accumulator tank into the boiler.

16. The propulsion and electrical system of claim 13, wherein the heat sink is a heat exchanger including a fluid passage for the supply water to flow therethrough.

17. The propulsion and electrical system of claim 16, wherein the heat exchanger is a water jacket at least partially surrounding the fuel cell.

18. The propulsion and electrical system of claim 13, wherein the steam system further includes a condenser downstream of the turbine to receive the combustion gases and to condense the extracted water from the combustion gases.

19. The propulsion and electrical system of claim 18, wherein the turbine engine further includes a nacelle circumferentially surrounding the fan, and the nacelle defines a bypass airflow passage between the nacelle and the turbo-engine,
wherein the fan includes a plurality of fan blades that rotates to generate a volume of air that is split and flowing into the bypass airflow passage as bypass air and flows into the core air flow path as core air, and
wherein the condenser is located in the bypass airflow passage for bypass air to cool the combustion gases and to condense the water from the combustion gases.

20. The propulsion and electrical system of claim 18, wherein the condenser generates an exhaust-water mixture including the extracted water, and
wherein the steam system further includes a water separator located downstream of the condenser, the water separator separating the extracted water from an exhaust-water mixture.

* * * * *